Feb. 14, 1967  R. E. WARNER ETAL  3,304,052
ROTOR STRUCTURE FOR AN ELASTIC FLUID UTILIZING MACHINE
Filed March 30, 1965  2 Sheets-Sheet 1

WITNESSES:
John L. Clopp
James F. Young

INVENTORS
Ronald E. Warner and
Ivar Johnsson
BY
Jack Evans Jr.

United States Patent Office 3,304,052
Patented Feb. 14, 1967

3,304,052
ROTOR STRUCTURE FOR AN ELASTIC FLUID UTILIZING MACHINE
Ronald E. Warner, Media, and Ivar Johnsson, Newtown Square, Pa., assignors to Westinghouse Electric Corporation, Pittsburgh, Pa., a corporation of Pennsylvania
Filed Mar. 30, 1965, Ser. No. 443,864
7 Claims. (Cl. 253—39)

This invention relates to machine rotor structures, more particularly to rotor structures for elastic fluid utilizing machines, such as turbines and compressors, and has for an object to provide an improved structure of this type.

In many instances involving large axial-flow elastic fluid utilizing machines, such as steam turbines, for example, the rotor structure is of such large size that at least some of the blade-carrying discs and the rotor shaft are formed as separate forgings and assembled by shrink-fitting the discs onto the rotor shaft. This arrangement frequently results in bending or warping of the rotor shaft due to the large compressive forces developed during the radial contraction of the discs onto the shaft.

It is a primary object of this invention to provide an arrangement for drivingly connecting a rotor disc to a rotor shaft in a manner that substantially eliminates the possibility of shaft warping due to compressive forces on the shaft.

It is another object to provide a rotor structure for an axial-flow elastic fluid utilizing machine, in which the separately formed disc is drivingly connected to the rotor shaft in a simple, yet highly reliable manner, and with a minimum of warping stresses induced on the shaft by such driving connection.

Briefly, in accordance with the invention there is provided a rotor structure for an elastic fluid utilizing machine, such as a steam turbine, for example, wherein the rotor shaft is provided with a surface portion of circular cross-section and a separately formed disc member having a central bore of slightly larger diameter than the circular surface portion of the shaft is mounted on the circular surface portion and maintained in driving relation therewith by a concentric tubular portion having one end portion attached to the shaft and another portion of relatively thin cross-section that acts as a radial flexure member to accommodate any thermal expansion in the rotor shaft adjacent the disc member.

The invention is susceptible of many variations in practice and several embodiments are shown and will be described.

The above and the objects are effected by the invention as will be apparent from the following description and claims taken in connection with the accompanying drawings, forming a part of this specification, in which:

Figure 1:
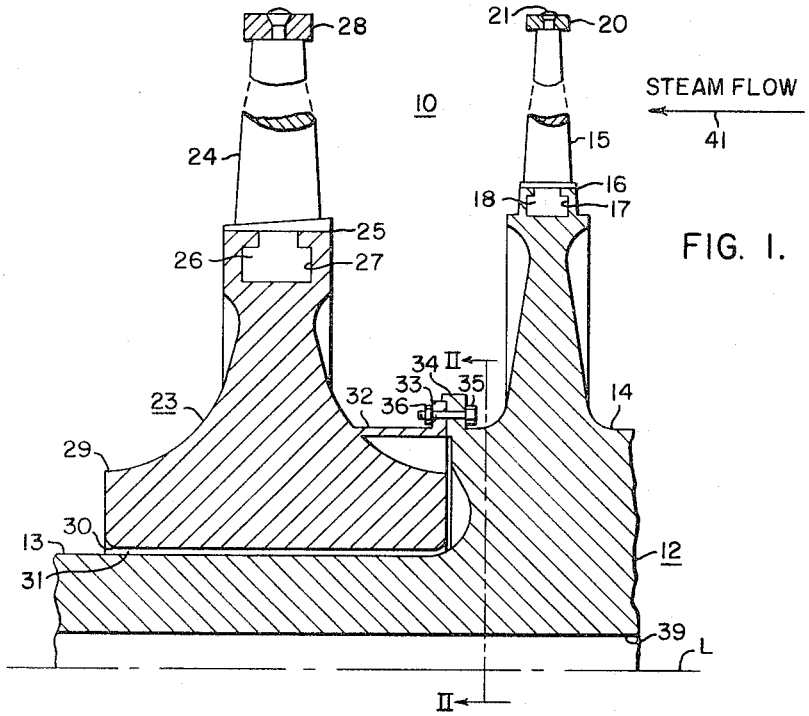
FIGURE 1 is a longitudinal radial sectional view of a portion of a steam turbine rotor structure formed in accordance with the invention.
Figure 2:
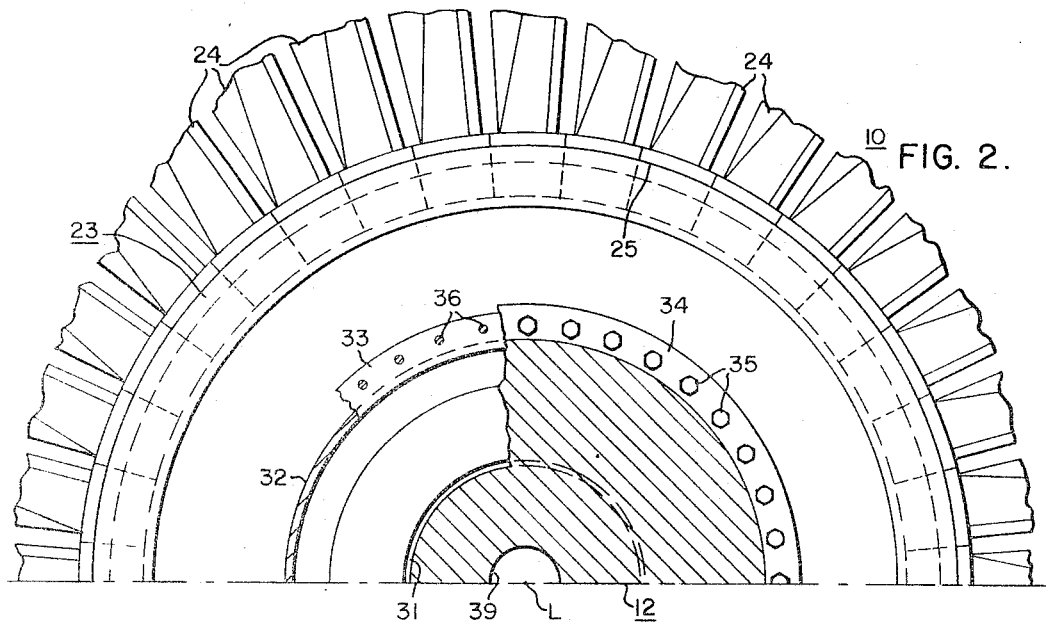
FIG. 2 is an enlarged 180° sectional view taken on line II—II of FIG. 1, with portions cut away for clarity.

Referring to the drawings in detail, in FIGS. 1 and 2 there is shown a rotor structure generally designated 10 for an axial-flow elastic fluid utilizing machine such as a steam turbine. Since the rotor structure may be of considerable length and is necessarily symmetrical with regard to its longitudinal axis L, the illustrations show only a fragmentary view of the rotor structure. Accordingly, it will be understood that the lower half of the rotor structure (not shown) may be substantially identical to the upper half and forms a continuation thereof.

The rotor structure 10 comprises a rotor shaft 12 having a cylindrical surface portion 13 of reduced radial extent and a disc portion 14 extending radially outwardly to a considerably greater degree than the radius of the cylindrical portion 13. The disc portion 14 has an annular array of turbine blades 15 mounted in a circumferential row about its outer rim or periphery 16 and these blades may be secured to the disc 14 in any suitable manner. In the illustration shown, the outer peripheral portion 16 of the disc 14 is provided with a circumferential recess 17 and the blades 15 are provided with roots 18 of generally dovetailed shape received in the recess 17 and secured therein as well known in the art. Also, as well known in the art, the blades 15 may be connected to each other at their outermost tips by a circular shroud structure 20 suitably secured to the blades 15 in a suitable manner, for example by riveting, as indicated by the riveted heads 21.

A second disc member 23 is disposed in axially spaced relation with the disc 14 and is provided with an annular row of blades 24 extending radially outwardly from the periphery 25 of the disc member 23 and secured to the disc member by roots and recesses 26 and 27, in substantially the same manner as the blades 15 are secured to the disc 14. Further, the blades 24 may be connected to each other by a circular shroud structure 28 in the same manner as the shroud structure described in conjunction with the blades 15. The disc member 23 is provided with a relatively wide base 29 of annular shape having a central circular bore 30 extending therethrough and of slightly larger diameter than the diameter of the rotor shaft portion 13. The bore 30 is of cylindrical shape and jointly with the cylindrical surface 13 of the rotor shaft 12 defines a small annular clearance space 31 surrounding the shaft portion 13.

The disc member 23 is provided with an integral tubular connecting portion 32 that is of thin walled cylindrical shape and is radially spaced from the bore 30 and extends in an axial direction toward the disc member 14. The cylindrical member 32 is further provided with an annular flange 33 that is disposed in abutting relation with a similar flange 34 provided on the disc 14, and the two flanges 33 and 34 are securely connected to each other by a circular array of bolts 35 and nuts 36 extending through suitable apertures in the flanges 34 and 33.

The rotor shaft 12 is usually provided with an axially extending bore 39. Hence, the portion 13 of the rotor shaft is of hollow cylindrical shape.

The rotor structure 10, as previously explained, is intended for use in an axial-flow elastic fluid utilizing machine such as a steam turbine (not shown), and in operation motive steam is directed past the blades 15 and 24, as indicated by the arrow 41, and the energy of the steam is extracted by the blades 15 and 24 to rotatably drive the rotor structure 10, as well known in the art.

During such driving effort, the disc member 23 is effective to transmit its driving torque to the rotor shaft 12 by way of the disc 14, such driving effort being transmitted from the rotor disc 23 by the cylindrical member 32 through the flanges 33, 34, and the bolts 35 to the disc 14 and thence to the rotor shaft 12. Since the disc 23 defines the circular clearance space 31 with the shaft portion 13, the rotor shaft 12 and the circular shaft portion 13 is free to expand radially in operation because of the heating effect of the steam flow past the blades 15 and 24, without exertion of compressive forces by the disc member 23 thereon.

Also, since the cylindrical connecting member 32 is thin walled, it is radially flexible and accommodates readily any difference in centrifugal and thermal expansion transmitted through the attached flanges 33 and 34, while still maintaining concentricity with the disc portion 14 and the rotor shaft portion 13. A further feature is that the cylindrical member 32 (because of its shape) is highly resistant to torsion and transverse bending. Hence, the possibility of bending or warping the rotor shaft 12 is substantially eliminated yet the disc member 23 is drivingly connected to the rotor shaft 12 in a highly precise and reliable manner.

Figure 3:
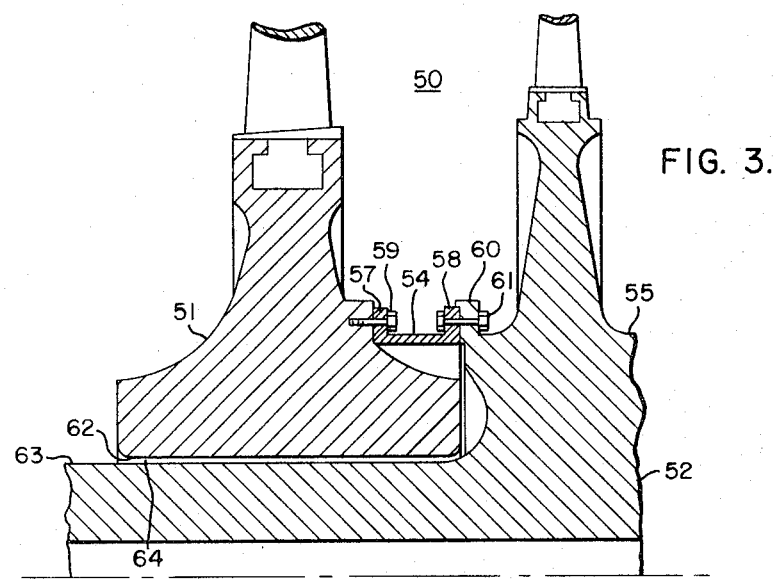
FIGS. 3, 4 and 5 are views similar to FIG. 1 but illustrating other embodiments.

In FIG. 3, there is shown a rotor structure 50 that is generally similar to the rotor structure 10 shown and described in connection with FIGS. 1 and 2. However, in this embodiment, the driving connection between the rotor disc member 51 and the rotor shaft 52 is provided by a separately formed hollow cylindrical member 54 interposed between the disc member 51 and the disc portion 55 integral with and forming a part of the rotor shaft 52. The cylindrical member 54 is similar to the cylindrical member 32 shown and described in connection with the first embodiment, but is provided with flanges 57 and 58 on opposite ends rigidly connected to the disc member 51 by an annular array of bolts 59 and to the annular flange 60 of the disc portion 55 by an annular array of bolts 61.

Here again, the disc member 51 is provided with a central bore 62 of slightly larger radial extent than cylindrical surface portion 63 of the rotor shaft 52 so that a small annular clearance space 64 is provided therebetween. From the above, it will be seen that the rotor structure 50 effects a driving connection between the rotor disc 51 and the rotor shaft 52 that is as effective and reliable in operation as that illustrated in FIGS. 1 and 2.

Figure 4:
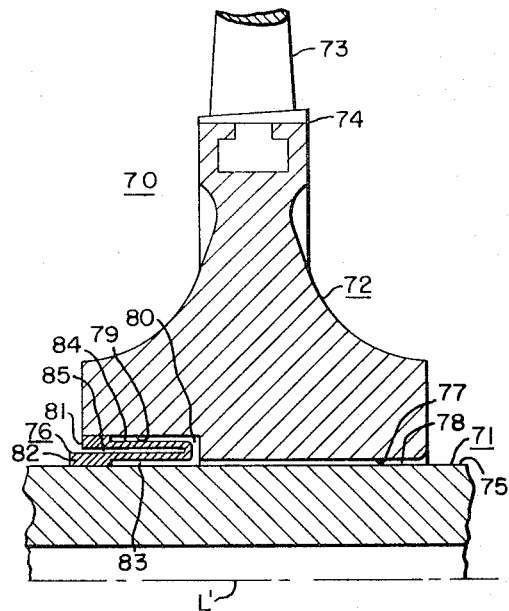

In FIG. 4, there is shown another embodiment of the invention wherein a rotor structure 70 is illustrated comprising a rotor shaft 71 having a disc member 72 securely attached thereto in accordance with another aspect of the invention. Here again, the disc member 72 is provided with the usual annular array of blades 73 attached to its outer periphery in the same manner as described in conjunction with the other two embodiments. In this embodiment however, the disc member 72 is directly connected to the circular surface portion 75 of the rotor shaft 71 by a ring member 76 interposed between the disc member 72 and the surface portion 75.

The disc member 72 is provided with a central bore 77 of slightly larger radial extent than that of the rotor shaft surface 75 so that a small clearance space 78 is jointly formed. The bore 77 is enlarged at the left end in any suitable manner to provide a larger cylindrical bore portion 79, and a larger space 80 for receiving the connecting ring member 76.

The connecting ring member 76 is of U-shaped cross-section with an enlarged or thickened ring portion 81 disposed in encompassed abutment with the bore 79 of the disc member 72 and an enlarged ring portion 82 disposed in encompassing abutment with the surface 75 of the rotor shaft 71. The ring portions 82 and 81 are disposed in radially spaced relation with each other and connected to a thin U-shaped portion comprising concentric inner and outer tubular portions 83 and 84 that extend in a direction parallel to the axis L' of the rotor shaft 71 and are joined at one end. The connecting member 76 is a one piece construction and is so formed that at normal atmospheric temperatures the total radial extent of the ring portions 81 and 82 with the space 85 defined therebetween by the U-shaped portion is of slightly larger extent than the radial extent of the space 80.

To assemble the disc 72 to the shaft 71, the connecting member 76 is heated to a degree sufficient to permit it to be slidably mounted on the rotor shaft 71 and the rotor disc 72 is heated to a greater degree than the connecting member 76 to permit the disc member to be slidably fitted about the ring member 81 by movement from right to left when viewed as in FIG. 4. When the entire structure is cooled to normal ambient values, the ring portions 81 and 82, as well as the disc member 72, will shrink radially. Accordingly, a shrink fit is obtained between the connecting ring portion 82 and the rotor shaft 71 to securely connect the connecting member 76 to the rotor shaft 71. Although the connecting ring portion 81 also undergoes some shrinking, the rotor disc 72 undergoes a larger amount of shrinking since it was originally heated to a higher value. Hence in the resulting reduction in size due to shrinkage, the disc 72 is shrink-fitted to the connecting ring portion 81 to form a secure connection therewith.

Accordingly, the disc member 72 is securely connected to the rotor shaft 71 in the region of the connecting ring portions 81 and 82 but compressive forces on the rotor shaft 71 are minimized since the shrink-fitting is in a limited region and this feature is further enhanced by the inherent flexibility of the U-shaped portions 83 and 84.

Figure 5:
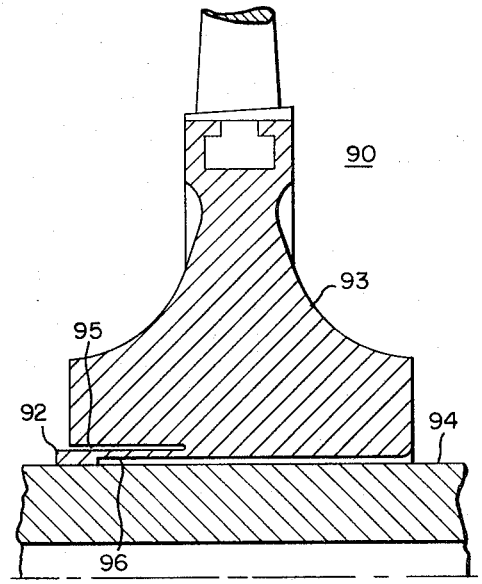

In FIG. 5, there is shown a rotor structure 50 in accordance with another embodiment of the invention. The rotor structure 90 is similar to that shown and described in conjunction with FIG. 4. However, in this embodiment, the connecting member 92 for attaching the rotor disc 93 to the rotor shaft 94 is formed integrally with the disc member 93 and is connected to the rotor disc 93 by a cylindrical rib 96 of thin cross-section and partly defined by a cylindrical groove 95. The rib 96 is flexible and is effective to absorb the torsional stresses and to provide the floating action described in conjunction with the other embodiments.

Although several embodiments of the invention have been shown, it will be obvious to those skilled in the art that it is not so limited, but is susceptible of various other changes and modifications without departing from the spirit thereof.

We claim as our invention:
1. An elastic fluid utilizing machine rotor structure comprising
   a rotor shaft having a portion of circular cross-section,
   a disc member having a wide base provided with a circular bore freely encompassing said circular shaft portion and jointly therewith defining an annular clearance space,
   said disc member having an annular row of blades, and
   means for drivingly connecting said disc member to said shaft, said means including a radially flexible yet torsion resistant tubular member disposed in spaced concentric relation with said shaft portion and having one end portion securely connected to said disc member and another end portion securely connected to an integral portion of said shaft,
   said tubular member having a width less than half the width of said base portion.
2. The structure recited in claim 1, wherein
   the integral portion of the rotor shaft is an integral disc portion carrying an annular row of blades, and
   the other end of the tubular member is securely connected to said disc portion.
3. The structure recited in claim 1, wherein
   the integral portion of the rotor shaft is an integral disc portion carrying an annular row of blades and having an annular flange disposed in spaced concentric relation with the circular shaft portion, the other end of the tubular member is provided with an annular flange, and
   said flanges are connected to each other.
4. A turbine rotor structure comprising
   a rotor shaft of circular cross-section;
   a rotor disc member having a wide base provided with a circular bore freely encompassing said shaft to provide a wide bearing surface;
   said disc member having an annular row of blades, and
   means for drivingly connecting said disc member to said shaft,
   said means including an annular member having an annular portion in shrink-fitted relation with said shaft and a tubular portion of thinner cross-section than said shrink-fitted portion, and said tubular portion being securely connected at one end to said shrink-fitted portion and at another end to said disc member, said tubular portion extending axially for a minor portion of the width of said base.

5. The structure recited in claim 4, wherein the tubular portion is integral with the disc member and is at least partially defined by an annular recess in the disc member, said recess extending axially for a minor portion of the disc member.

6. An elastic fluid utilizing machine rotor structure comprising a rotor shaft having a portion of cylindrical shape, a rotor disc member having a wide base provided with a bore of cylindrical shape disposed in spaced encompassing relation with said cylindrical shaft portion to provide a wide bearing surface, said disc member having an annular row of blades, and means disposed in said space for drivingly connecting said disc to said shaft, said means including an annular member having a U-shaped cross-section extending axially for a minor portion of said base, and defined by concentric inner and outer tubular portions connected at one end and having a pair of radially spaced opposite end portions, one of the spaced end portions being disposed in shrink-fitted relation with said disc member and the other of the spaced end portions being disposed in shrink-fitted relation with said cylindrical shaft portion.

7. The structure recited in claim 6, wherein the one spaced end portion is disposed in encompassed internally shrink-fitted relation with the disc member, and the other spaced end portion is disposed in encompassing externally shrink-fitted relation with the cylindrical shaft portion.

References Cited by the Examiner

UNITED STATES PATENTS

| | | | |
|---|---|---|---|
| 1,873,956 | 8/1932 | Dahlstrand | 253—39 X |
| 2,305,768 | 12/1942 | Gente. | |
| 2,623,727 | 12/1952 | McLeod. | |
| 2,749,086 | 6/1956 | Lombard | 253—39 |
| 2,858,101 | 10/1958 | Alford | 253—39 X |

FOREIGN PATENTS

| | | |
|---|---|---|
| 375,363 | 7/1921 | Germany. |
| 219,655 | 10/1924 | Great Britain. |

MARTIN P. SCHWADRON, *Primary Examiner.*

EVERETTE A. POWELL, JR., *Examiner.*